L. ATWOOD.
Oil Still.
No. 21,805.
Patented Oct 19, 1858.
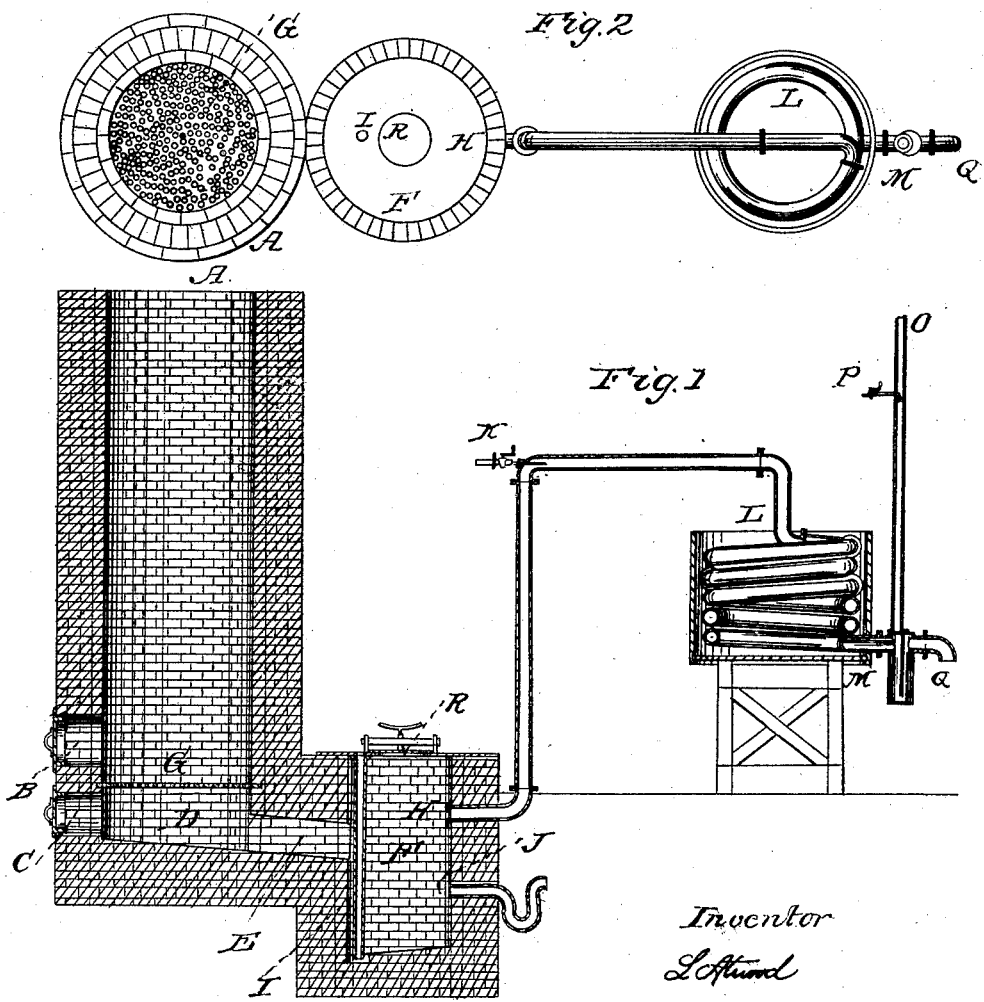
Inventor
L. Atwood

UNITED STATES PATENT OFFICE.

L. ATWOOD, OF BROOKLYN, NEW YORK.

IMPROVEMENT IN EXTRACTION OF VOLATILE OILS, &c., FROM COAL.

Specification forming part of Letters Patent No. 21,805, dated October 19, 1858.

*To all whom it may concern:*

Be it known that I, LUTHER ATWOOD, of Brooklyn, Kings county, New York, have invented a new and improved mode of manufacturing oils from bituminous coals, schistus, shale, peat, wood, and other substances yielding pyrogenic oils which maintain their figure sufficiently while in process of decomposition to permit of the free passage of a current of heated products of combustion through a mass of moderate-sized fragments; and I do hereby declare that the following is a full and exact description thereof and of apparatus I use, reference being had to the annexed drawings, forming a part of this specification, in which—

Figure 1 is a vertical longitudinal section, and Fig. 2 a plan view, of the form of apparatus I use.

The nature of my invention consists, first, in a method of applying the heated products of the combustion of fuel, after having passed through a layer of ignited or partially-ignited coke, directly to the body I wish to decompose in such manner as to initiate chemical changes resulting in the production of oleaginous vapors and oil, the body acted on being protected by the intervening layer of coke or its equivalent from the direct contact and action of the flame; second, in a method of removing the oleaginous vapors and volatile matters immediately away from the point where they are thrown off, and away from further action of the heat conducing to and resulting from their production, and through the remaining portion of the mass acted upon, communicating heat thereto and through the apparatus by means of a current of products of combustion, in a manner more particularly hereinafter described; third, in separating crude oil gradually from the current of products of combustion and decomposition by a gradually-decreasing temperature, substantially as hereinafter described; fourth, in obtaining crude oil from coal and other solid substances yielding pyrogenic oils by the combined and successive action and operation of the above-mentioned methods of treatment.

Letter A, Fig. 1, represents a vertical hollow cylinder of brick or other suitable material in which fire, coke, and coal or other similar substances to be decomposed are deposited and arranged in a manner to be hereinafter described. I call this cylinder a "distilling-tower." It is open at the top, and is provided with a perforated diaphragm or grate, G, which extends transversely across it near the lower end. Just above and below the grate are man-holes closed by air-tight stoppers at B and C. Below the grate G is a cavity, D, the floor of which is inclined toward the inclined passage E, which, proceeding at the same inclination, enters the covered tar-cistern F, connecting it with the cavity D. The cistern-cover is provided with a man-hole and plate at R, secured by a screw, so as to make an air-tight joint.

I is a dip-tube leading down through the cistern-cover (which should be air-tight) nearly to the bottom of the cistern, and used for the purpose of pumping out the cistern.

J is a pipe terminating with an inverted siphon, used to discharge oil from the cistern, at the same time preventing the ingress of air. The draft-pipe H connects the tar-cistern with the worm-condenser situated in the tub L, which should be filled with cool water, as usual. The lower end of the worm-pipe passes through the side of the tub and connects with the dip-pipe M, which is provided with a separating-diaphragm for the purpose of separating the fluids from the gases coming from the condenser, the fluids passing out at Q, and the gases and more volatile products escaping through the pipe O after being washed by a jet of water from the rose of pipe P, which should be connected with a fountain-head or force-pump. At K a steam-jet pipe provided with a suitable valve and connected by couplings to a pipe from a steam-boiler, as may be most convenient, is introduced into pipe H in such manner as to direct the admitted blast of steam (which should be highly elastic) in a direction leading from the distilling-tower and toward the worm-condenser, thereby inducing a current which enters the top of the distilling-tower and passes through the apparatus and out of pipe O.

While the operation is going on the dip-pipe I and the siphon J are sealed by the crude oil which collects in the cistern; but if there be no oil in the cistern when the operation commences these openings must be sealed or plugged up until sufficient oil collects, when it may be suffered to run out of J. The openings at B and C being stopped air-tight, also the man-hole R, the current induced by the rapid passage of steam from the jet K to the condenser can only be admitted through the opening or top of the distilling-tower A, whence it passes through the apparatus to K, thence through the condenser, and out at O.

The operation of my process is as follows, viz: I charge the distilling-tower with coal or other similar substance to be decomposed in moderate-sized fragments to within about two feet of the top. On and over the coal I spread evenly and compactly a layer of dry coke from sixteen to twenty inches in depth in fragments of small size. About an inch cube will answer. Over this layer of coke I spread a layer of ignited coke and partially open the steam-jet valve to induce such draft as to draw down the heat and gradually ignite the coke beneath the burning layer. As the layer of coke becomes gradually heated heat is communicated to that portion of the coal immediately adjacent, and the operation of decomposition commences, the oily vapors and volatile products thrown off from the coal by the action of the heat being removed by the current of products of combustion of the coke downward and away from the heat. The oil driven out from the coal also drips down through the mass and away from the heat. As the mixed current of products of combustion and products of decomposition passes down through the cooler portions of the coal, communicating heat thereto, a part of the oily particles with which it is laden separate from it and drip down through the perforated bottom and run into the tar-cistern, the current continuing to lose oil while passing through the cavity D, passage E, tar-cistern, and the upright part of the pipe H by reason of the gradually-decreasing temperature. This portion of the crude oil is the major part of the whole result obtained, and is collected in and discharged from the tar-cistern when it fills up above pipe J. The remainder may be removed by introducing a lift-pump into the dip-tube I. The fluid products of decomposition are still further separated from the mixed current while passing through the worm-condenser and by the water-jet. They are collected in the dip-pipe M, and, passing around the diaphragm therein, flow out at Q accompanied with water, from which the crude oil may be separated by permitting the whole to discharge into a vessel from which the water escapes through a hole in the bottom, and the oil drawn off at the top. The products of combustion and the more volatile products of decomposition pass out of the pipe O. As the coal is progressively decomposed it becomes suitable fuel, and may be progressively burned to supply heat to keep up the process of decomposition; but the process must be so conducted by the proper regulation of the steam-blast that there shall always be an intervening layer of coke between the fire and the coal to be decomposed of sufficient thickness to protect the coal from the direct action of the fire. Care must therefore be taken that the coke shall not burn faster on one side than it progressively forms from the coal. The process may, however, be conducted with varying degrees of rapidity; also, in such manner that the intervening layer of coke progressively increases, so that the residue contains all or nearly all the coke formed from the coal, the coke first introduced being all or nearly all that is consumed and converted into ashes.

It being necessary in this process to exclude the coal and vapors from contact with atmospheric air, the free oxygen of which would effect combustion, care must be taken to stop the man-holes air-tight, also to permit no large openings to form through the fire, and that the draft be so regulated that no more air shall pass through the fire than is deprived of its free oxygen by combustion.

When the charge is exhausted, the residue may be removed through the man-hole B, and any ashes that may fall into cavity D may be taken out through man-hole C.

I do not intend to confine myself to the use of a steam-jet as a means of inducing a current of products of combustion, but will use any known controllable means for inducing a properly-regulated current, and the object of the steam-jet at K being simply to induce a current, it may for that purpose be applied at any convenient point—say at or near the end of the pipe O. The form of the apparatus may also be varied, provided the essential features of the process are retained.

The great advantage of my process is the obtaining of oil from large masses of coals at the lowest possible temperature without the use of expensive retorts commonly used, and saving the expense of the numerous attendants required to watch them.

It is peculiar to my process that the coal is at no time exposed to contact with red-hot metal while being decomposed; neither is it exposed to contact with fire at any time while being decomposed, the intervening layer of coke protecting it from the fire, the heat radiated from which and the heat of the products of combustion alone being gradually employed to decompose the coal. For this reason the oil resulting is vastly superior, being free from matters which are the results of higher temperatures.

What I claim as my invention, and desire to secure by Letters Patent of the United States, is—

1. The gradual and progressive formation at a comparatively low temperature of oleaginous vapors and oil from coal or other substances yielding pyrogenic oils by the gradual and progressive action of the heat of products of combustion upon and through the mass operated on, substantially as hereinbefore described, and substantially for the purposes hereinbefore set forth.

2. The immediate removal of the oleaginous vapors and volatile products of decomposition from the point of formation away from further action of the heat conducing to and resulting from their production through the remainder of the mass and apparatus by means of a properly-regulated current of products of combustion, substantially as hereinbefore described.

3. Condensing the liquid volatile products of distillation within the body of the distilling-tower and during the continuous distillation of the solid materials, substantially as hereinbefore described.

4. Obtaining crude-oil from coal and other solid substances yielding pyrogenic oils by the combined and successive operation of the above-mentioned methods of treatment.

LUTHER ATWOOD.

Witnesses:
W. H. L. SMITH,
JAMES S. SAVAGE, Jr.